Apr. 17, 1923. 1,452,345
I. F. KEPLER ET AL
TIRE STRUCTURE FOR TRACTORS
Filed Sept. 15, 1921
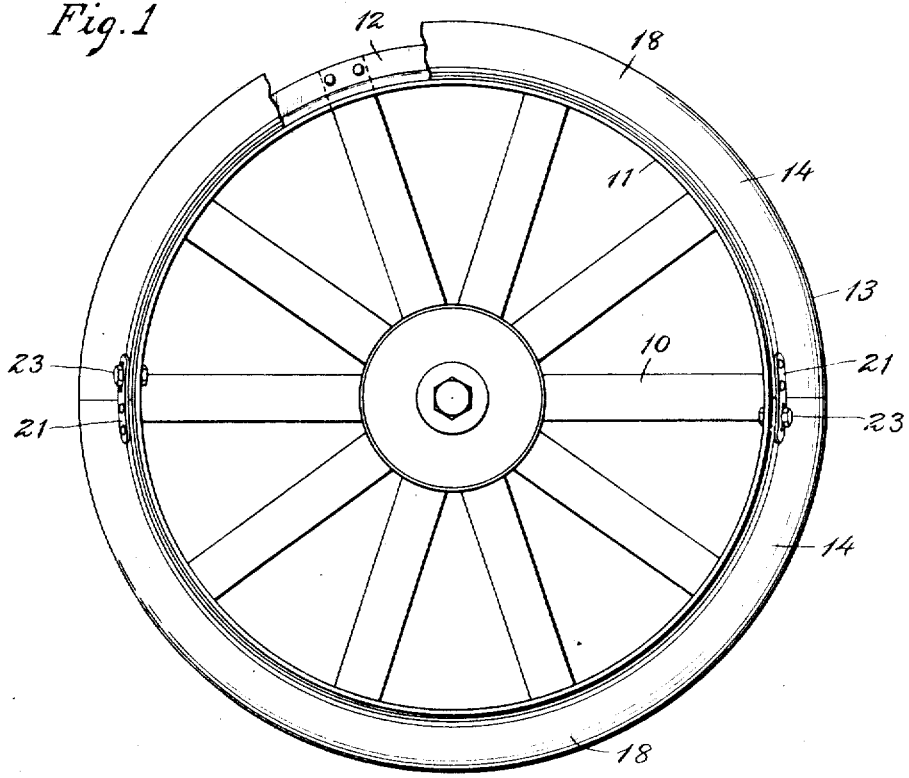
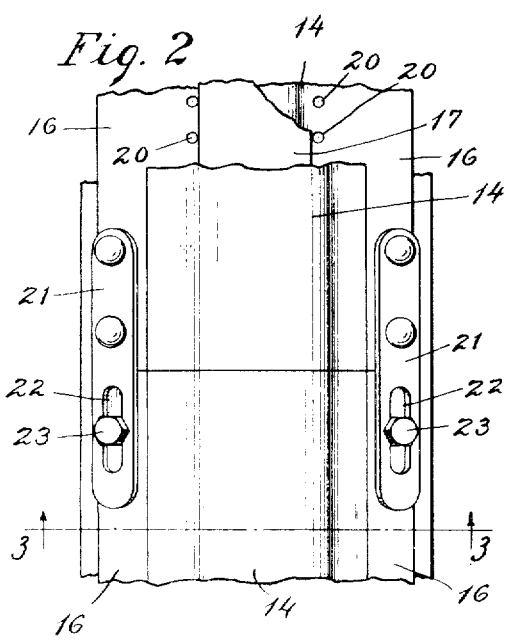
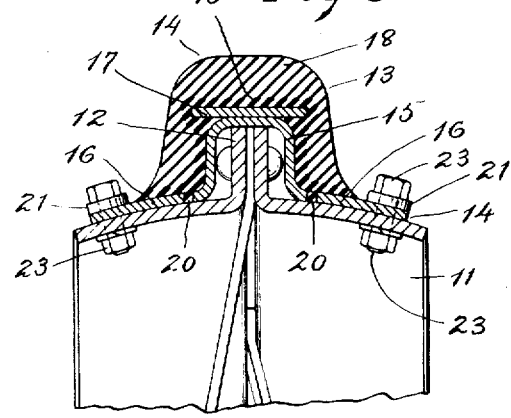
Inventor
Irwin F. Kepler
Arthur A. Robb
By Robert M Pierson
Atty.

Patented Apr. 17, 1923.

1,452,345

UNITED STATES PATENT OFFICE.

IRWIN F. KEPLER AND ARTHUR A. ROBB, OF AKRON, OHIO, ASSIGNORS TO THE B. F. GOODRICH COMPANY, OF NEW YORK, N. Y., A CORPORATION OF NEW YORK.

TIRE STRUCTURE FOR TRACTORS.

Application filed September 15, 1921. Serial No. 500,866.

*To all whom it may concern:*

Be it known that we, IRWIN F. KEPLER and ARTHUR A. ROBB, citizens of the United States, residing at Akron, in the county of Summit and State of Ohio, have invented a certain new and useful Tire Structure for Tractors, of which the following is a specification.

This invention relates to cushioning tires for tractors, and especially the front or steering wheels thereof, and its object is to provide an improved tire structure, preferably detachable, to enable these wheels to travel over paved streets and highways at a good speed without injury to the road surface or excessive shock to the tractor.

Of the accompanying drawings:

Fig. 1 is a side elevation, partly broken away, showing a tractor wheel provided with a tire constructed according to our invention.

Fig. 2 is a plan view at one of the joints.

Fig. 3 is a transverse section of the wheel-rim and tire.

In the drawings, 10 is an ordinary tractor wheel whose permanent rim 11 in this instance is made of two sheet-metal rings, slightly concavo-convex in section, and formed at their meeting edges with radially out-turned flanges riveted together and clamping the outer ends of the spokes between them, these flanges forming a middle circumferential rib designated as a whole by 12. The wheel is ordinarily run bare in soft ground, and the rib embeds itself in the ground as an aid to steering.

Our improved tire 13, in the preferred form here shown, is made in two circumferential segments 14, 14, of equal length, bolted together and to the wheel at their ends to form a complete annulus and arched or U-shaped in transverse section to straddle the rib 12 and to fit the wheel-rim on either side of said rib. Each tire segment comprises a sheet-metal base-member having an arched middle portion 15 for receiving the rib 12, side flanges 16 resting against and conforming to the side portions of the wheel-rim 11, and a sheet-metal band-segment 17 secured to the crown of the base-member 14 in a suitable manner, as by spot welding, and overhanging the arched middle portion 15 of said base member at both sides.

18 is a soft-rubber tread member vulcanized upon a layer of hard rubber 19, which immediately surrounds the band-segment 17, the arched portion 15 and the adjacent portions of the side flanges 16 of the base-member for securing adequate adhesion of the soft-rubber cushion to said base-member, the latter being formed with rows of perforations 20, for interlocking the hard rubber with the metal. The interlocking is also promoted by the overhanging edges of the band-segment 17, embedded in the hard rubber.

One end of each of the tire segments 13 has riveted to the side flanges 16 of its base-member one end of each of a pair of tie-plates 21, the other end of which overlaps the adjacent portion of the side flange of the adjoining base segment. The overlapping end of each tie-plate 21 is formed with a longitudinal slot 22, occupied by the stem of a bolt 23, which passes through perforations in the tire-base flanges 16 and in the rim 11 for adjustably securing together the ends of the tire segments and attaching them to the wheel.

In applying our invention to the steering wheels of a tractor, the rim of the wheel is drilled on both sides at opposite points with four holes to receive the stems of the bolts 23, the steering end of the tractor is jacked up and the two segments 14 of the tire are fitted on the wheel with their ends together and the bolt holes in the tire-base 14 aligned with the bolt holes in the wheel rim. The tie-plates 14 on one end of each tire segment will overlap the adjacent end of the base of the other segment, and the stems of the bolts 23 may then be passed through the slots 22 in said tie-plates and through the holes in the tire-base and wheel-rim, and drawn up tight with the ends of the tire segments as close together as possible and the base snugly fitting the wheel rim. A tractor having its steering wheels thus tired and preferably also having its driving wheels or members provided with rubber cushions may be driven over paved streets and highways at considerable speed without damage to the roadway or excessive shock to the tractor. These tires may be left on while the tractor is used in soft ground, or they may be removed and the bare wheels used in the ordinary manner.

We do not confine ourselves to the exact details of construction herein described.

We claim:

1. The combination of a tractor wheel having a radially-projecting, circumferential rib on its periphery, a segmental cushion tire of arched form straddling said rib, and means for securing the segments of said tire on the wheel.

2. The combination of a tractor wheel having a peripheral, circumferential rib, an arched tire straddling said rib and made in a plurality of segments, and means for detachably securing the ends of said segments together upon the wheel on opposite sides of said rib.

3. A vehicle tire comprising a plurality of segments of transversely arched form, each of said segments comprising a metal base member and a rubber cushion member vulcanized thereto, and means for clamping the base members of said segments to a wheel, said cushion members being held in place chiefly by their vulcanized attachment to said base members.

4. A tire for the steering wheels of tractors, said tire being made in a plurality of segments, each comprising an arched metal base having a soft-rubber tread member secured thereon by vulcanization, and means for securing the adjoining ends of said segments in annular form upon the wheel.

5. A tire for the steering wheels of tractors, said tire being made in segments each comprising a metal base having an arched middle portion, side attaching flanges, and a pair of longitudinal tie-plates each having one end secured to its segment and the other end overlapping the base of the adjoining segment and formed with a longitudinal slot, and bolts adapted to pass through said slot and through holes in the segment bases and wheel rim for securing said segments together upon the wheel.

6. A tire segment for a steering wheel of a tractor, said segment comprising a metal base having an arched middle portion and side attaching flanges, a metal band-segment secured to the crown of said arched middle portion and overhanging the sides thereof, a hard-rubber layer embracing and vulcanized to said band segment and arched portion of the metal base, and a soft-rubber tread vulcanized upon said hard-rubber layer.

In witness whereof we have hereunto set our hands this 9th day of September, 1921.

IRWIN F. KEPLER.
ARTHUR A. ROBB.